(12) United States Patent
Nakanishi

(10) Patent No.: US 6,736,422 B2
(45) Date of Patent: May 18, 2004

(54) HEAD-PROTECTING BAG DEVICE

(75) Inventor: Ryosuke Nakanishi, Shiga (JP)

(73) Assignee: Takata Corporation, Tokyo (JP)

( * ) Notice: Subject to any disclaimer, the term of this patent is extended or adjusted under 35 U.S.C. 154(b) by 65 days.

(21) Appl. No.: 10/063,704

(22) Filed: May 8, 2002

(65) Prior Publication Data

US 2002/0167154 A1 Nov. 14, 2002

(30) Foreign Application Priority Data

May 9, 2001 (JP) ........................................ 2001-138874

(51) Int. Cl.[7] ............................................... B60R 21/22
(52) U.S. Cl. ................................................... 280/730.2
(58) Field of Search ..................................... 280/730.2

(56) References Cited

U.S. PATENT DOCUMENTS

| | | | | |
|---|---|---|---|---|
| 5,364,126 A | * | 11/1994 | Kuretake et al. | 280/730.1 |
| 5,501,489 A | * | 3/1996 | Folsom et al. | 280/743.1 |
| 5,531,477 A | * | 7/1996 | Madrigal et al. | 280/743.1 |
| 5,884,937 A | | 3/1999 | Yamada | |
| 6,264,237 B1 | * | 7/2001 | Terada | 280/743.1 |
| 6,595,548 B2 | * | 7/2003 | Kamano et al. | 280/743.1 |
| 6,601,614 B1 | * | 8/2003 | Ishii | 139/389 |
| 2001/0038196 A1 | * | 11/2001 | Yamamoto et al. | 280/728.3 |
| 2002/0149186 A1 | * | 10/2002 | Halford et al. | 280/743.1 |
| 2002/0158450 A1 | * | 10/2002 | Hoeft et al. | 280/730.2 |

FOREIGN PATENT DOCUMENTS

| | | |
|---|---|---|
| EP | 0 980 796 A2 | 2/2000 |
| EP | 1 112 900 A2 | 7/2001 |

* cited by examiner

*Primary Examiner*—Charles T. Jordan
*Assistant Examiner*—Jordan Lofdahl
(74) *Attorney, Agent, or Firm*—Foley & Lardner LLP

(57) ABSTRACT

A head-protecting bag for an occupant in an automobile is provided. The bag is not likely to be caught at an inner surface of a compartment as it inflates downward along a lateral side of the compartment. The bag includes an intermediate folded-body which is formed by folding a plurality of times along folding lines extending in a longitudinal direction of the automobile. The intermediate folded-body is bellows-folded from its lower end to its upper end. As a result, the lower edge of its head-protecting bag is positioned toward the lower end side of the folded body. Since the lower edge of the bag is positioned toward the lower end side of the folded body, the folded body inflates always downward along the lateral side of the compartment.

11 Claims, 8 Drawing Sheets

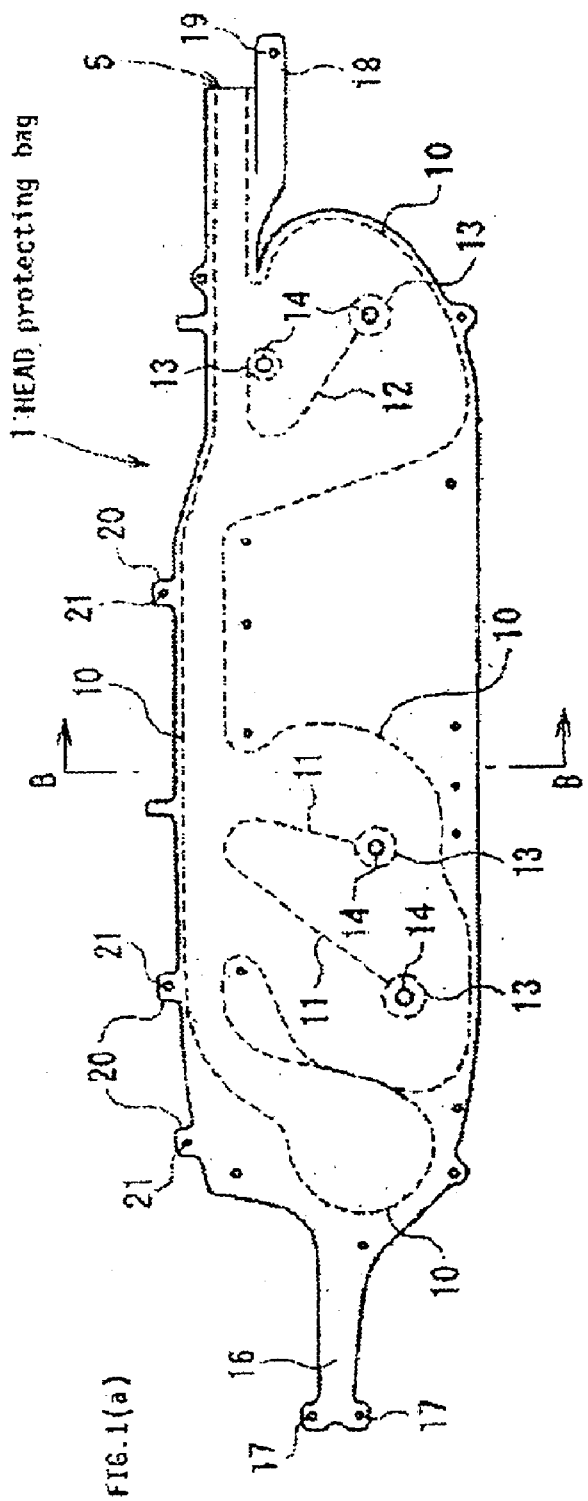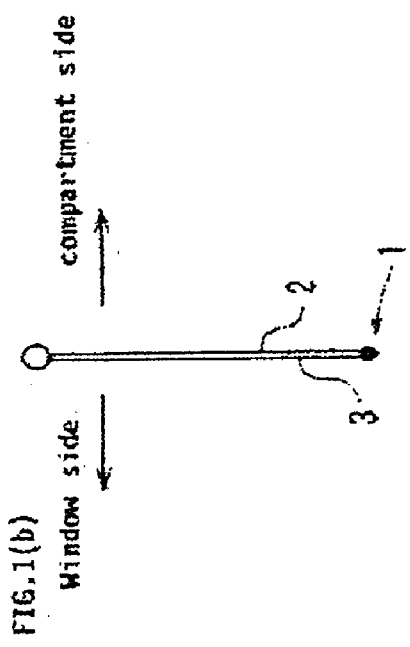
FIG.1(a)
FIG.1(b)

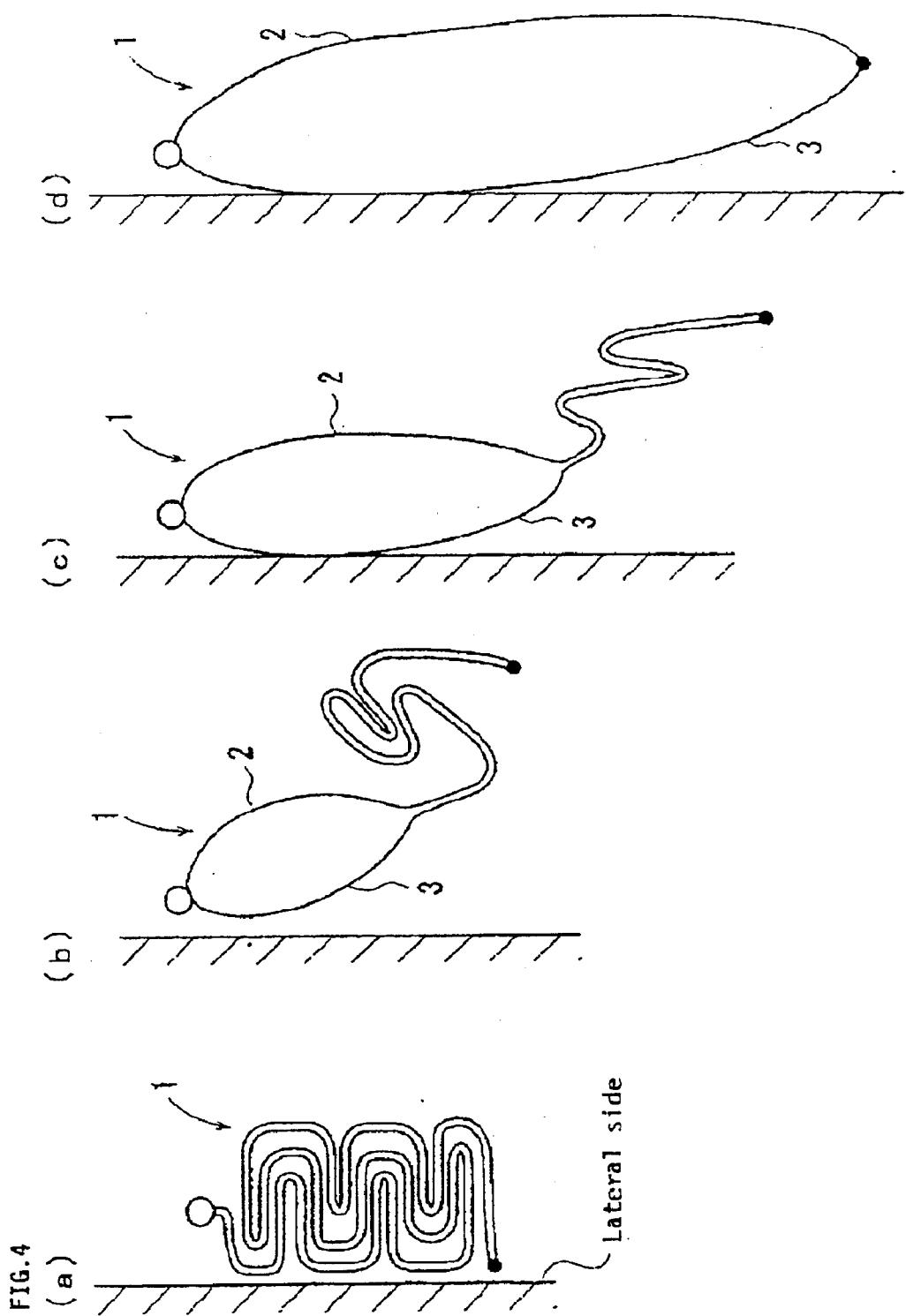

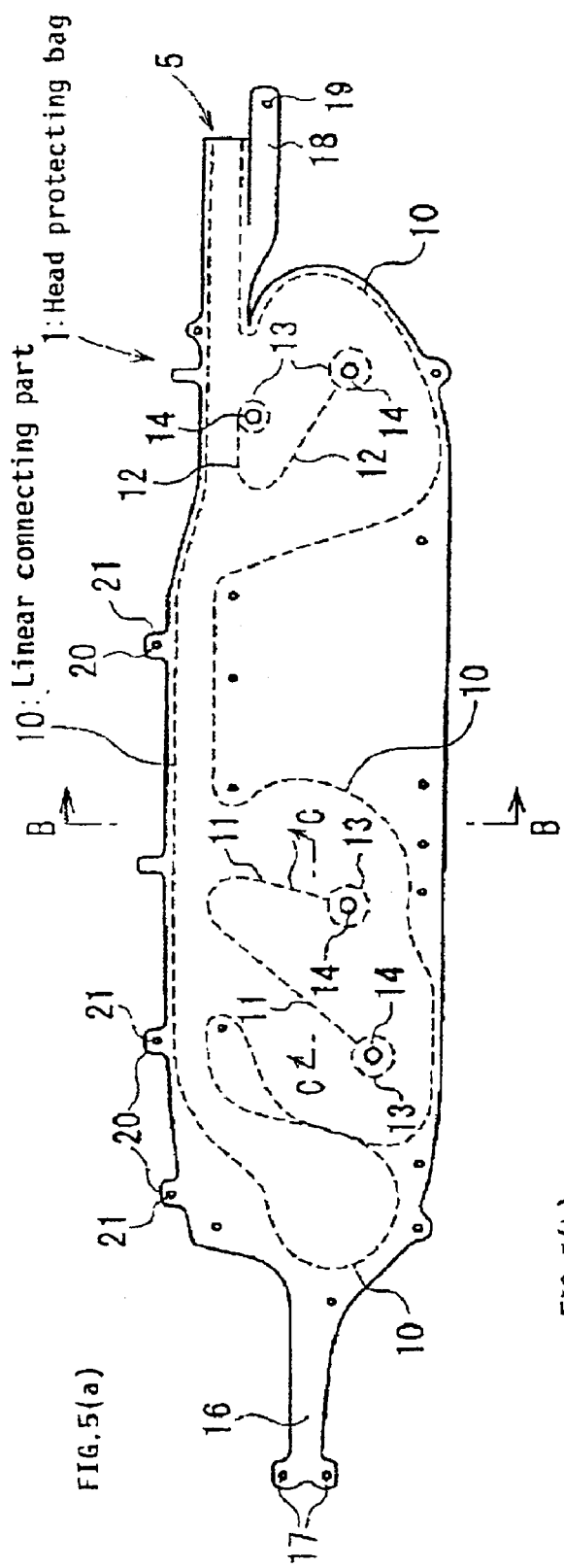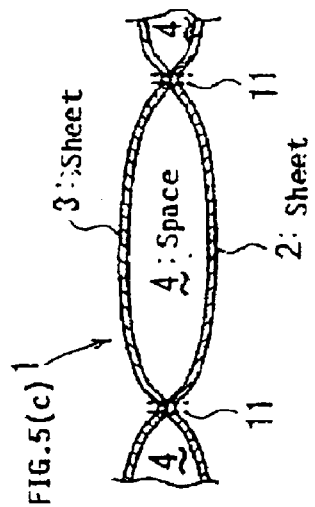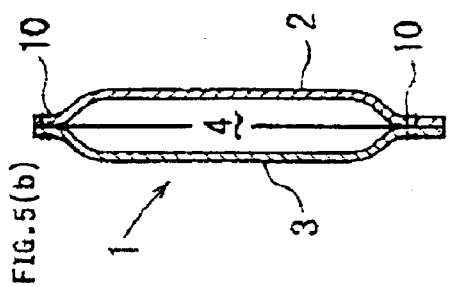

HEAD-PROTECTING BAG DEVICE

BACKGROUND

The present invention relates to head-protecting bags for occupants of automobiles. More specifically, it relates to a head-protecting bag device which is normally folded along an upper corner of a lateral side of a vehicle compartment and inflates as a curtain along windows of side doors and a B-pillar when the vehicle in involved in a side impact collision or rolls over.

A head-protecting bag for an automobile is typically folded along an upper corner of a lateral side of a compartment in a normal state (when the automobile is not in an emergency such as a collision), and inflates as a curtain along windows of side doors and a B-pillar when the automobile is involved in a side impact collision or rolls over. Such a head-protecting bag is typically formed with two sheets overlapping each other and connected to each other at edges thereof. The edges are stitched together with sewing threads along a linear connecting part to thereby form a space between the sheets to be filled with gas. The head protecting bag is typically referred to as a head side curtain or curtain type bag.

The configuration of a known head-protecting bag for occupants in an automobile is described below with reference to FIGS. 5 and 6.

The known head-protecting bag 1 includes a compartment-side sheet 2 and a window-side sheet 3 that overlap each other and are sewn together. A space 4 is formed between the sheets 2 and 3. Although the sheets 2 and 3 are separate bodies, they may be formed with one piece of sheet which is folded and the folded portions of the sheet overlap each other.

The sheets 2 and 3 are connected to each other along various linear connecting parts. A linear connecting part 10 extends along the peripheral edge of the sheets 2 and 3 (the linear connecting part 10 partly deviates from the edge toward a central portion of the overlapping sheets 2 and 3). Linear connecting parts 11 and 12 that divide the space 4 are provided. In addition, the bag 1 includes annular connecting parts 13 for reinforcing portions in the vicinities of the ends of the linear connecting parts 11 and 12. The sheets 2 and 3 are cut away at the insides of the annular connecting parts 13 to thereby form circular openings 14.

The head-protecting bag 1 extends along a lateral side of the compartment in the longitudinal direction of the automobile. The head-protecting bag 1 is provided with protrusions 16 and 18, one of which protrudes from the front end of the head-protecting bag 1 and the other protrusion protrudes from the rear end thereof. The protrusions 16 and 18 are provided with holes 17 and 19 for fixing the head-protecting bag 1 to the automobile body. The head-protecting bag 1 is also provided with a plurality of protrusions 20 upward protruding from an upper edge of the head-protecting bag 1, the protrusions 20 each being provided with a hole 21 for fixing the head-protecting bag 1 to the automobile body.

The head-protecting bag 1 is provided with an inlet 5 at the front end or the rear end of the head-protecting bag 1 for introducing gas from an inflator (not shown). In the exemplary embodiment shown in FIG. 5, the inlet is located at the rear end. The gas inlet may be disposed at a position other than that described above. The inflator may be disposed inside the head-protecting bag 1.

The upper and lower ends of the linear connecting part 11, 12 are separate from the upper and lower portions, respectively, of the linear connecting part 10. The linear connecting part 11, 12 is connected at the upper and lower ends thereof to the annular connecting parts 13. The linear connecting parts 11 and 12 prevent the space 4 between the sheets 2, 3 from expanding to have an excessively large thickness. The annular connecting parts 13 reinforce the ends of the linear connecting parts 11 and 12.

The head-protecting bag 1 is connected to an A-pillar of the automobile via bolts, rivets, or the like applied through the holes 17 of the protrusion 16 which is disposed, for example, at the front side. The bag 1 is connected to a C-pillar via a bolt, a rivet, or the like applied through the hole 19 of the protrusion 18 which is disposed at the rear side. The bag 1 is connected to a roof side-rail via bolts, rivets, or the like applied through the holes 21 of the protrusions 20 which are disposed at the upper edge of the head-protecting bag 1. As shown in FIG. 6(a), the head-protecting bag 1 is disposed along the upper corner of a lateral side of the compartment in a state in which the head-protecting bag 1 is folded along the roof side-rail.

The folded head-protecting bag 1 may be covered with a cover (not shown). The cover is broken or opens when the head-protecting bag 1 inflates.

When the automobile collides at the side or rolls over, the head of the occupant is protected in such a manner that the inflator (not shown) operates, gas flows into the space 4 through the gas inlet 5 (see FIG. 6(b)), and the head-protecting bag 1 inflates and extends downward as a curtain along the lateral side of the compartment as shown in FIGS. 6(c)–6(e).

The head-protecting bag 1 is generally folded in a form of bellows (in a zigzag) from the lower edge toward the upper edge thereof, as shown in FIG. 6(a). In FIGS. 6(a) to 6(e), white circles represent the upper edge of the head-protecting bag 1, and black circles represent the lower edge of the head-protecting bag 1.

However, when gas starts to flow from the inflator into the head-protecting bag 1 which is folded as described above, and the head-protecting bag 1 inflates from the upper edge toward the lower edge (in the steps shown in FIGS. 6(b) and 6(c)), the lower edge of the head-protecting bag 1 is likely to be caught by the lateral side of the compartment. When the high-pressure gas is further supplied into the head-protecting bag 1 in this state and a lower portion of the head-protecting bag 1 starts to inflate, stiffness of the head-protecting bag 1 is increased due to the rising inner pressure and the head-protecting bag 1 tends to extend straight. Therefore, the lower edge of the head-protecting bag 1 is strongly pressed to the lateral side of the compartment and the head-protecting bag 1 is bent in a V-shape, as shown in FIG. 6(d), whereby the head-protecting bag 1 does not extend downward smoothly.

In order to avoid such phenomenon that the bag does not smoothly extend because the lower edge thereof is caught by the lateral side of the compartment during the inflation of the bag, a folding method for folding a bag is studied, as shown in FIGS. 7 and 8. FIGS. 7(a) to 7(c) show the steps of folding a bag. FIGS. 8(a) to 8(d) show the steps in which the bag folded by this folding method is inflated. In FIGS. 7 and 8, white circles represent the upper edge of the head-protecting bag 1 and black circles represent the lower edge of the head-protecting bag 1.

As shown in FIG. 7(a), the head-protecting bag 1 is firstly folded once such that the lower half of the head-protecting bag 1 overlaps a surface thereof which faces the compartment side (the sheet 2). As shown in FIGS. 7(b) and 7(c), the folded head-protecting bag 1 is further folded in a zigzag from the lower end of the folded body of the folded head-protecting bag 1 toward the upper end thereof.

Therefore, when the head-protecting bag 1 folded as shown in FIG. 8(a) starts to inflate from the upper edge, as shown in FIG. 8(b), the lower half of the head-protecting bag 1 moves so as to incline apart from the lateral side of the compartment (toward the inner side of the compartment), as shown in FIG. 8(c), and the head-protecting bag 1 inflates extending downward.

In this folding method, the head-protecting bag 1 is folded so as to form a twofold body such that the lower half of the head-protecting bag 1 overlaps the surface of the head-protecting bag 1 facing the inner side of the compartment, then, the twofold body is folded in a zigzag in a vertical direction. Therefore, the lower edge of the head-protecting bag 1 passes separate from the lateral side of the compartment (that is, away toward a central part of the compartment) when the head-protecting bag 1 folded in a zigzag is firstly released and the twofold body thereof is unfolded, whereby the lower edge of the head-protecting bag 1 is prevented from being caught by the lateral side of the compartment.

However, in the folding method shown in FIGS. 7 and 8, the head-protecting bag 1 is unfolded such that the lower half of the head-protecting bag 1 swings by an angle of 180 degrees when inflating to extend downward from the state of the head-protecting bag 1 as the twofold body shown in FIGS. 8(b) and 8(c). Therefore, during the inflation, there is a likelihood that the lower portion of the bag protrudes toward the central part of the compartment. For example, when the bellows-folded portion shown in FIG. 8(c) inflates quickly, the head-protecting bag 1 extends such that the lower portion thereof protrudes to the right direction in FIG. 8(c).

Accordingly, an object of the present invention is to provide a head-protecting bag device for occupants in an automobile, which is not likely to be caught by a lateral side of a compartment and inflates extending downward along the lateral side when the head-protecting bag device inflates to extend.

SUMMARY OF THE INVENTION

According to an embodiment of the present invention a head-protecting device for occupants in an automobile is provided. The device includes a bag which is connected at an upper part thereof to a portion of an automobile body in the vicinity of a corner between a ceiling and a lateral side of a compartment of the automobile. The bag inflates with gas extending downward along the lateral side. The bag is folded in a zigzag form an even number of times along folding lines extending in a longitudinal direction of the automobile so as to form an intermediate folded-body, and the intermediate folded-body is further folded in a zigzag form along folding lines extending in the longitudinal direction of the automobile.

The bag of the head-protecting device includes an intermediate folded-body of a bag which is formed such that the lower portion of the bag is folded in a zigzag an even number of times (when being folded twice, the intermediate folded-body is formed as a threefold body) so that the lower portion of the bag overlaps surfaces of the bag facing toward the inside of the compartment along folding lines extending in a longitudinal direction of the automobile. Then, the intermediate folded-body of the bag is bellows-folded. Therefore, the lower edge of the bag thus folded is positioned toward the lower end side of the folded body.

When the folded body of the bag deploys, the bellows-folded state of the bag along the lateral side of the compartment is released first, then, the remaining folded portion deploys downward along the lateral side of the compartment and slightly separate from the lateral side of the compartment, whereby the bag can extend smoothly without being caught by the lateral side of the compartment when inflating. Since the lower edge of the bag is positioned toward the lower end side of the folded body, the folded body always inflates downward along the lateral side of the compartment without the folded body swinging by an angle of 180 degrees during the inflation.

The intermediate folded-body preferably comprises a threefold body formed by being folded twice along two folding lines extending in the longitudinal direction of the automobile, thereby easing folding.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 1(a) and 1(b) are a front view and a sectional view, respectively, of a head-protecting bag for occupants in an automobile in a folding step, according to an embodiment of the present invention.

FIGS. 4(a), 4(b), 4(c), and 4(d) are illustrations showing the steps of inflating the head-protecting bag.

FIG. 5(a) is a front view of a known head-protecting bag.

FIG. 5(b) is a sectional view along line B—B of the head-protecting bag shown in FIG. 5(a).

FIG. 5(c) is a sectional view along line C—C of the head-protecting bag shown in FIG. 5(a).

DETAILED DESCRIPTION

Embodiments according to the present invention are described below with reference to the drawings.

Figure 2A:
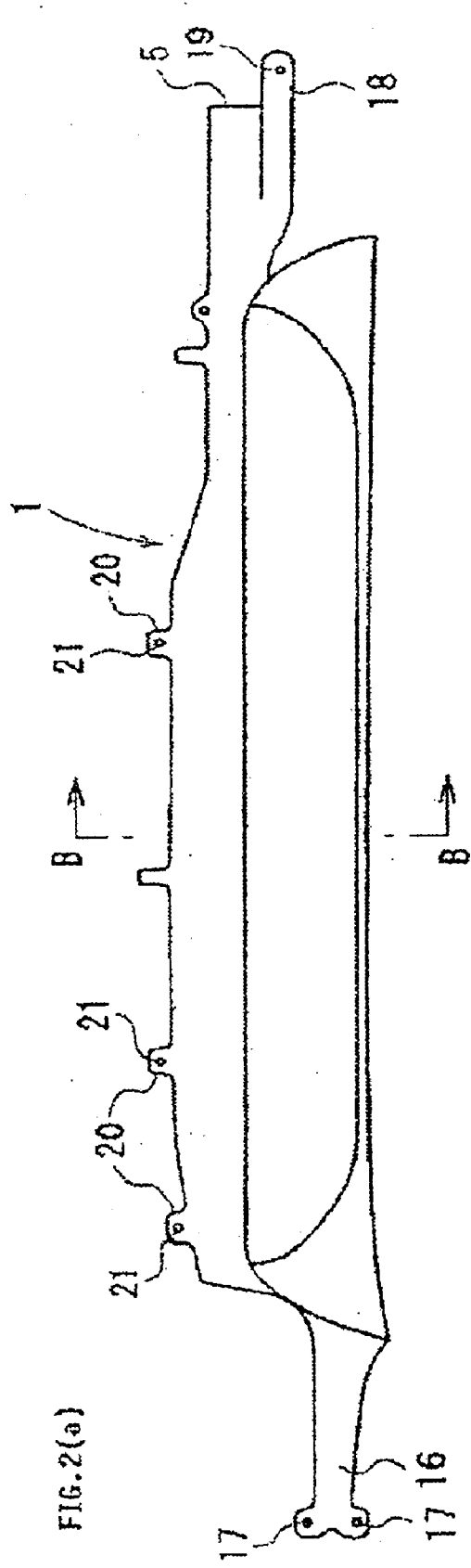
FIGS. 2(a) and 2(b) are a front view and a sectional view, respectively, of the head-protecting bag in another folding step.
Figure 2B:
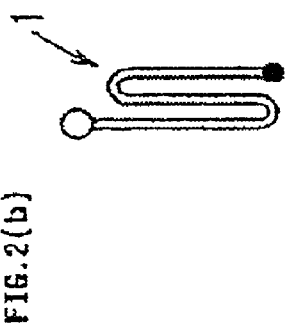
Figure 3A:
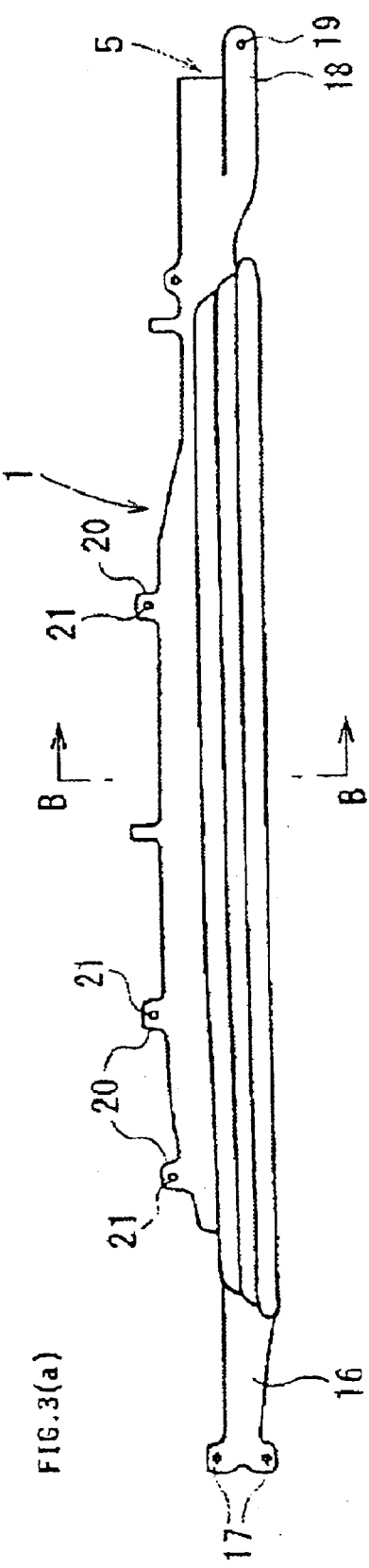
FIGS. 3(a) and 3(b) are a front view and a sectional view, respectively, of the head-protecting bag in another folding step.
Figure 3B:
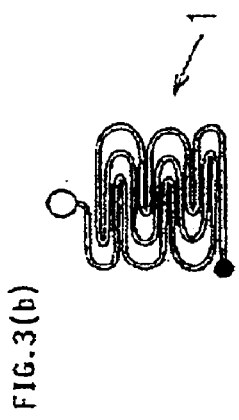
Figure 6:
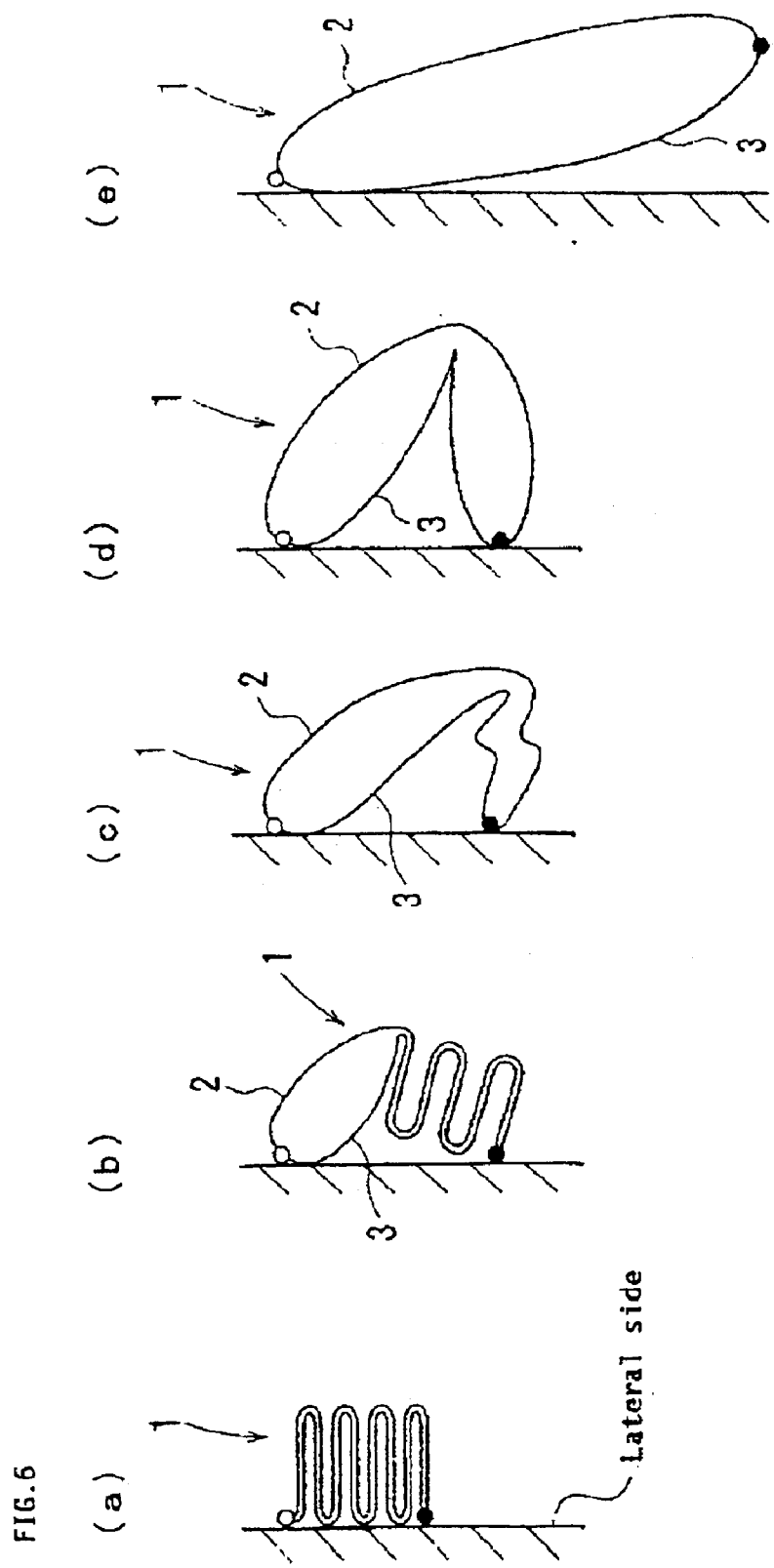
FIGS. 6(a) and 6(e) are illustrations showing inflation steps starting from the folded state of the known head-protecting bag shown in FIGS. 5(a) to 5(c).
Figure 7:
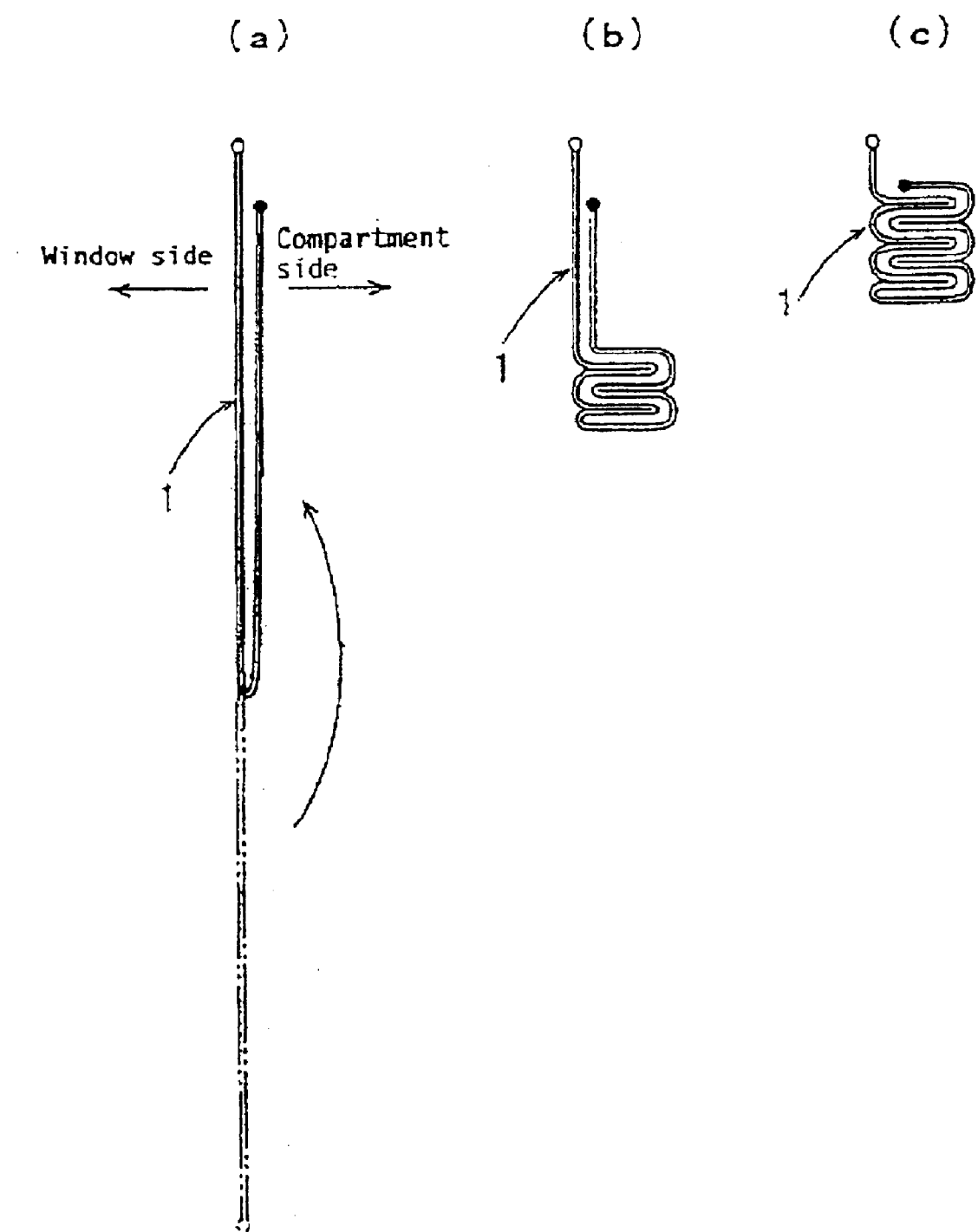
FIGS. 7(a), 7(b), and 7(c) are illustrations showing the steps of folding the known head-protecting bag.
Figure 8:
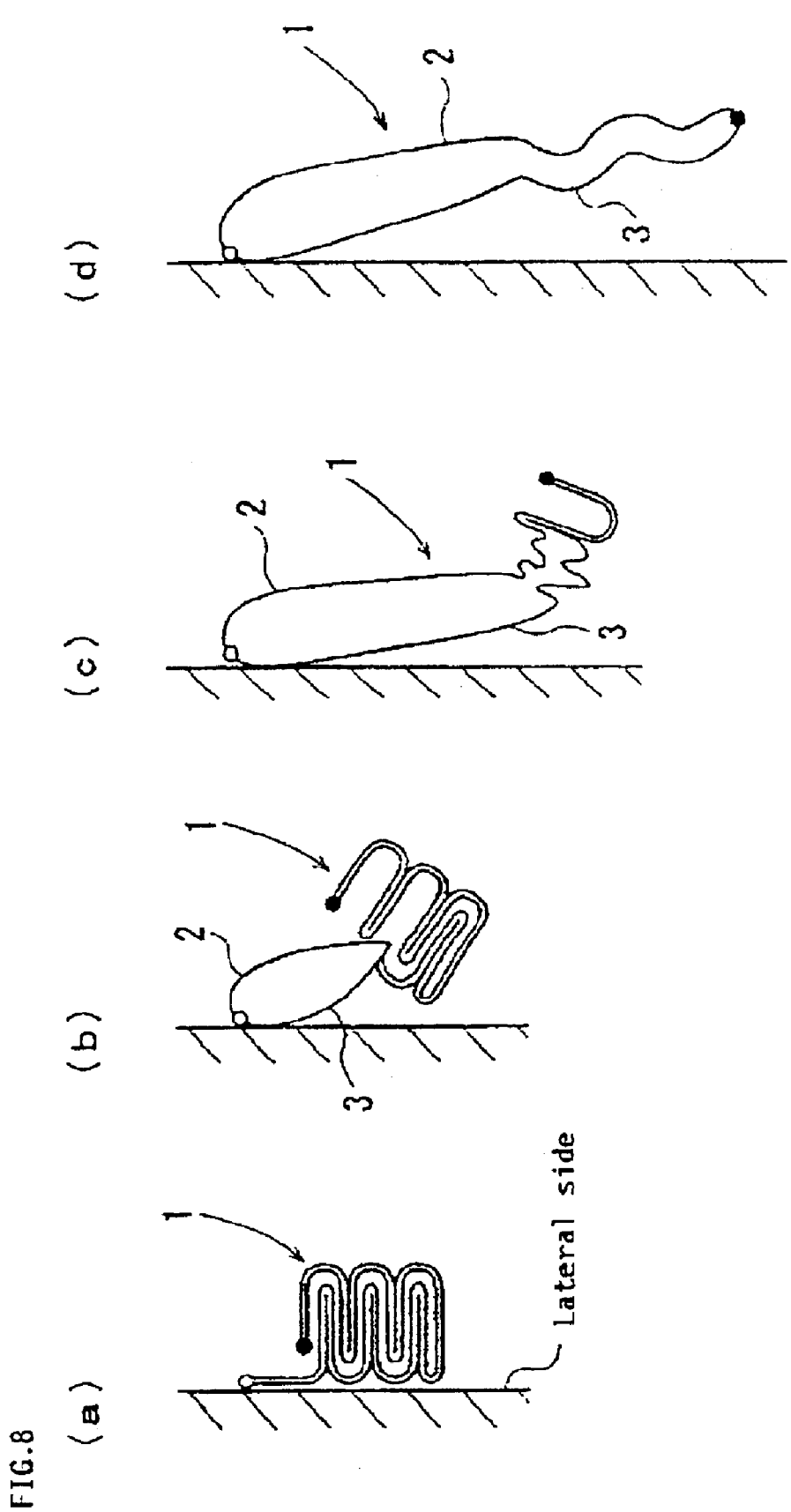
FIGS. 8(a), 8(b), 8(c), and 8(d) are illustrations showing inflation steps starting from the folded state of the head-protecting bag shown in FIGS. 7(a) to 7(c).

FIGS. 1(a), 2(a), and 3(a) are front views showing steps of folding a head-protecting bag for occupants in an automobile, according to an embodiment of the present invention. FIGS. 1(b), 2(b), and 3(b) are sectional views along lines B—B of the head-protecting bag shown in FIGS. 1(a), 2(a), and 3(a), respectively. FIGS. 4(a) to 4(d) are sectional views of the head-protecting bag while inflating to deploy from a folded state. In FIGS. 1(b), 2(b), 3(b), and 4(a) to 4(d), the upper edge of the head-protecting bag is represented by a white circle, and the lower edge thereof is represented by a black circle.

According to the present embodiment, a head-protecting bag 1 is provided with a space 4 formed between a compartment-side sheet 2 and a window-side sheet 3 which overlap each other and are sewn together. The sheets 2 and 3 are connected to each other at a linear connecting part 10 disposed along the peripheral edges of the sheets 2 and 3 (partly deviating toward the inner sides of the sheets 2 and 3). Linear connecting parts 11 and 12 for dividing the space 4 are provided. Annular connecting parts 13 for reinforcing portions in the vicinity of the ends of the linear connecting parts 11 and 12. The sheets 2 and 3 are cut away at the insides of the annular connecting parts 13, thereby forming circular openings 14. The head-protecting bag 1 is provided at the rear end thereof with a gas inlet 5 for introducing gas from an inflator (not shown).

The head-protecting bag 1 is connected to an A-pillar of an automobile at a protrusion 16 disposed at, for example, the front end of the head-protecting bag 1 by bolts, rivets, or the like. The head-protecting bag 1 is connected to a C-pillar of the automobile at a protrusion 18 disposed at the rear end of the head-protecting bag 1 by a bolt, a rivet, or the like, and to a roof side-rail at protrusions 20 by bolts, rivets, or the like. Reference numerals 17, 19, and 21 indicate holes for receiving the bolts or rivets therethrough. The head-protecting bag 1 in a folded state along the roof side-rail is mounted to an upper part of doors of the automobile.

In a folding method, according to the present invention, the head-protecting bag 1 in a spread state (see FIG. 1) is firstly folded a plurality of times along lines extending in the longitudinal direction of the automobile so that the lower portion of the bag 1 overlaps the portions thereof facing toward the compartment (at the sheet 2 side), thereby forming an intermediate folded-body (see FIG. 2). According to the present embodiment, the head-protecting bag 1 is folded twice so as to form an intermediate threefold body.

Then, the intermediate folded-body of the head-protecting bag 1 is bellows-folded from the lower to the upper edges thereof, thereby reducing the dimension in the height direction (see FIGS. 3 and 4(a)). The lower edge of the head-protecting bag 1 is positioned toward the lower end side of the folded body.

The head-protecting bag 1 is preferably folded as described above before being mounted to the automobile.

The head-protecting bag 1 thus folded may be covered with a cover (not shown). The cover is broken or opens when the head-protecting bag 1 inflates. The cover may serve as a roof garnish for the automobile.

When the automobile is involved in a side collision or rolls over, an inflator operates, gas flows into the space 4 through the gas inlet 5, and the head-protecting bag 1 inflates to deploy downward along the lateral side of the compartment, thereby protecting the head of the occupant.

When the folded head-protecting bag 1 deploys, the head-protecting bag 1 starts to inflate from the upper edge thereof with the gas supplied by an inflator. The bellows-folded portion of the head-protecting bag 1 which is disposed toward the lateral side surface of the compartment is released first, as shown in FIG. 4(b). Then, the remaining folded portion deploys downward along the lateral side of the compartment and slightly away therefrom. In this case, since the lower edge of the head-protecting bag 1 is positioned toward the lower end side of the folded body of the head-protecting bag 1, the folded body extends always downward along the lateral side of the compartment.

When the folded head-protecting bag 1 according to the present invention inflates to deploy, the lower portion thereof extends slightly away from the lateral side of the compartment. As a result, the head-protecting bag 1 reliably and smoothly inflates and extends without being caught by the lateral side of the compartment. Moreover, since the lower edge of the head-protecting bag 1 is positioned toward the lower end side of the folded body, the folded body of the head-protecting bag 1 does not turn over. The bag always deploys downward along the lateral side of the compartment during the inflation. Therefore, the lower part of the head-protecting bag 1 does not protrude toward the occupant (to the right direction in FIG. 4(c)) even when, for example, the bellows-folded part shown in FIG. 4(c) rapidly inflates.

As described above, in the folding method for folding the head-protecting bag according to the present invention, the head-protecting bag is prevented from being caught by a lateral side of a compartment. Since the lower edge of the head-protecting bag is positioned toward the lower end side of a folded body thereof, the folded body of the head-protecting bag inflates to extend always downward along the lateral side of the compartment, whereby the head-protecting bag does not protrude toward the inner side of the compartment during its inflation.

The priority application, Japanese Patent Application No. 2001-138874, filed on May 9, 2001, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A head-protecting bag device for occupant in an automobile comprising:

a bag having an upper part connected to a portion of an automobile body in the vicinity of a corner between a ceiling and a lateral side of a compartment of the automobile, the bag being configured to be inflated with gas and extend downward along the lateral side, wherein the bag is folded in a zigzag form an even number of times along folding lines extending in a longitudinal direction of the automobile thereby forming an intermediate folded-body, and wherein the intermediate folded-body is further folded in a zigzag form along folding lines extending in the longitudinal direction of the automobile.

2. The head-protecting bag device of claim 1, wherein the intermediate folded-body comprises a threefold body formed by being folded twice along two folding lines extending in the longitudinal direction of the automobile.

3. A method of folding an airbag to be positioned along a side of a vehicle to protect an occupant's head comprising the steps of:

folding the airbag an even number of times along fold lines extending in the longitudinal direction of the vehicle to form an intermediate folded-body;

folding the intermediate folded-body along fold lines extending in the longitudinal direction of the vehicle, wherein the folding steps are performed so that a bottom portion of the airbag is maintained at the bottom of the folded airbag after the completion of each folding step.

4. The method of claim 3, wherein the step of folding the intermediate folded-body includes bellows folding the intermediate folded-body from a lower end to an upper end.

5. A method of folding an airbag to be positioned along a side of a vehicle to protect an occupant's head, comprising the steps of:
   a) providing an airbag having two opposite ends;
   b) bellows folding said airbag so that said opposite ends remain opposite, so as to form an intermediate folded body that is substantially completely bellows folded; and
   c) bellows folding said intermediate folded body.

6. The method of claim 5, wherein step b) comprises dividing said airbag into an odd number of substantially equal length sections and folding said airbag between said sections.

7. The method of claim 6, wherein said odd number is 3.

8. The method of claim 5, further comprising positioning said airbag along said side of said vehicle.

9. An airbag formed by the process comprising the steps of:
   a) providing an airbag having two opposite ends;
   b) bellows folding said airbag so that said opposite ends remain opposite, so as to form an intermediate folded body that is substantially completely bellows folded; and
   c) bellows folding said intermediate folded body.

10. The airbag of claim 9, wherein step b) comprises dividing said airbag into an odd number of substantially equal length sections and folding said airbag between said sections.

11. The airbag of claim 10, wherein said odd number is 3.

* * * * *